United States Patent
Yamamoto

(10) Patent No.: US 9,201,233 B2
(45) Date of Patent: Dec. 1, 2015

(54) MICROSCOPE AND DARKFIELD OBJECTIVE

(71) Applicant: OLYMPUS CORPORATION, Shibuya-ku, Tokyo (JP)

(72) Inventor: Hirofumi Yamamoto, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 120 days.

(21) Appl. No.: 14/065,044

(22) Filed: Oct. 28, 2013

(65) Prior Publication Data

US 2014/0126049 A1    May 8, 2014

(30) Foreign Application Priority Data

Nov. 5, 2012 (JP) ................. 2012-243361

(51) Int. Cl.
- *G02B 21/10* (2006.01)
- *G02B 21/08* (2006.01)
- *G02B 21/12* (2006.01)

(52) U.S. Cl.
CPC .............. *G02B 21/10* (2013.01); *G02B 21/084* (2013.01); *G02B 21/12* (2013.01)

(58) Field of Classification Search
CPC ....... G02B 21/10; G02B 21/084; G02B 21/12
USPC ........ 359/381, 387, 389; 362/3, 11, 140, 554, 362/555
See application file for complete search history.

(56) References Cited

U.S. PATENT DOCUMENTS

| 4,186,993 | A | * | 2/1980 | Shimizu et al. ............... 359/387 |
| 4,626,079 | A | | 12/1986 | Nakamura et al. |
| 4,720,191 | A | * | 1/1988 | Siegel et al. ................ 356/237.1 |
| 5,325,231 | A | * | 6/1994 | Tamura et al. ................ 359/387 |
| 5,859,727 | A | * | 1/1999 | Tsuchiya ....................... 359/387 |
| 2006/0039064 | A1 | * | 2/2006 | Kawahito ....................... 359/385 |
| 2007/0041109 | A1 | * | 2/2007 | Brehm et al. .................. 359/857 |
| 2010/0073935 | A1 | * | 3/2010 | Ben-Ezer .................. 362/311.12 |
| 2013/0335976 | A1 | * | 12/2013 | Ben-Ezer ....................... 362/308 |
| 2014/0092469 | A1 | * | 4/2014 | Rassier et al. ................ 359/387 |

FOREIGN PATENT DOCUMENTS

| JP | 02-097909 A | 4/1990 |
| JP | 4-48203 B2 | 8/1992 |
| JP | 2009-063856 A | 3/2009 |
| JP | 2012-013879 A | 1/2012 |

* cited by examiner

*Primary Examiner* — Frank Font
(74) *Attorney, Agent, or Firm* — Holtz Holtz, Goodman & Chick PC

(57) ABSTRACT

A microscope includes a microscope main body and a darkfield objective. The microscope main body includes a light source unit and a main body side fitting unit for fitting an objective, and the darkfield objective includes an optical system for capturing light from a sample surface and a fitting unit that fits in the main body side fitting unit. A darkfield illumination optical path through which light from the light source unit passes is formed in the darkfield objective. When the darkfield objective is attached to the microscope main body, the darkfield objective has incident end of the darkfield illumination optical path outside the fitting unit, where an optical axis of the optical system is central.

12 Claims, 13 Drawing Sheets

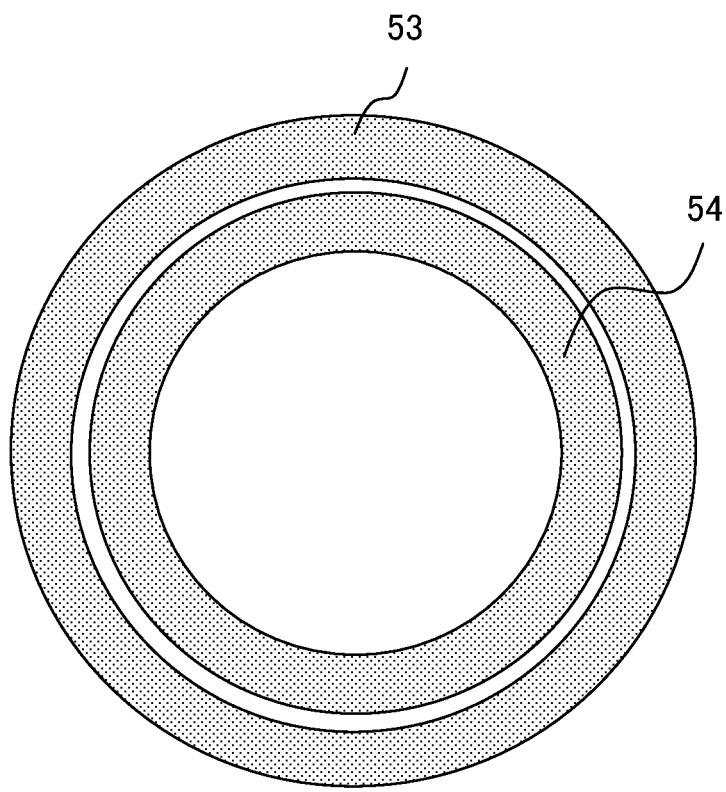
F I G. 10

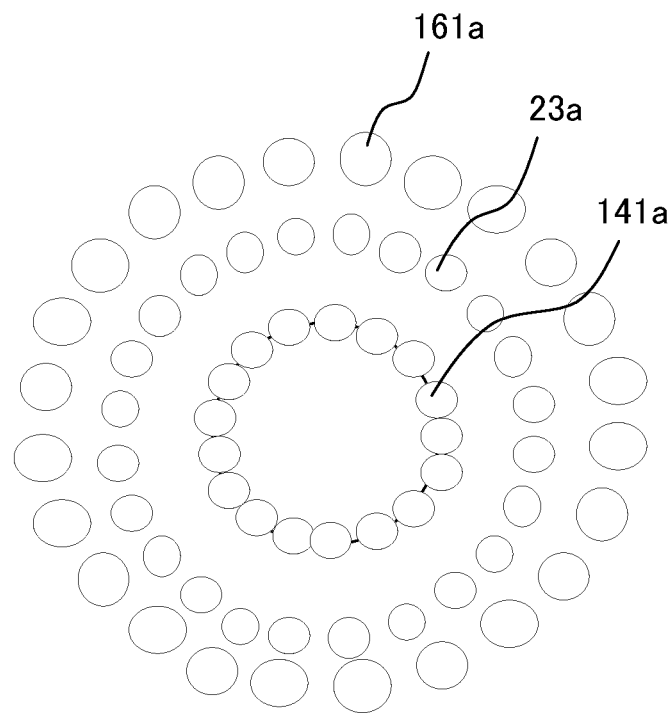
F I G. 1 3

MICROSCOPE AND DARKFIELD OBJECTIVE

CROSS REFERENCE TO RELATED APPLICATIONS

This application is based upon and claims the benefit of priority from prior Japanese Patent Application No. 2012-243361, filed Nov. 5, 2012, the entire contents of which are incorporated herein by this reference.

BACKGROUND OF THE INVENTION

1. Field of the Invention

The present invention relates to microscopes and darkfield objectives, and in particular, relates to microscopes and darkfield objectives that perform reflected darkfield illumination.

2. Description of the Related Art

Illumination methods that are adopted in conventional general microscopes for reflected darkfield observation fall into two broad categories.

In the first method, darkfield illumination is performed by using the light from a light source of a microscope main body, which is used for brightfield observation. Typically, the light from a light source of a microscope main body is reflected by hollow mirrors that are arranged in the microscope main body, and a circular luminous flux that enters the darkfield illumination optical path in a darkfield objective is formed. Moreover, it is usually the case that incident end of the darkfield illumination optical path in a darkfield objective is arranged inside the screw unit for fitting a darkfield objective to the microscope main body.

In the second method, darkfield illumination is performed by using the light from a light source that is provided for a darkfield objective. Typically, the emission end of a fiber light source or LEDs are circularly arranged outside the lens system of a darkfield objective, and a circular luminous flux is formed.

In recent years, there has been increasing demand for greater numerical apertures and greater working distances, and there has been a growing trend for a greater outside diameter of a lens system that constitutes an objective. Accordingly, the outside diameter of a darkfield illumination optical path that is formed outside the lens system is also increasing.

In regard to the above point, when the first method is adopted, the luminous flux diameter in the microscope main body may be thickened according to the upsizing of the outside diameter of a darkfield illumination optical path that is formed in this objective. However, the configuration in which a luminous flux with a thick diameter passes through a microscope main body causes a lot of disadvantages, such as the upsizing of an optical system in a microscope main body and arrangement restrictions. For this reason, as disclosed, for example, in Japanese Laid-open Patent Publication No. 2012-013879 and Japanese Examined Patent Application Publication No. 04-048203, a method in which a luminous flux with a conventional diameter is emitted from a microscope main body so as to enter an objective and the luminous flux diameter is enlarged inside the objective has been proposed.

On the other hand, when the second method in which a light source is arranged outside the lens system is adopted, no special action is required for the upsizing of a lens system that constitutes an objective. The second method is disclosed, for example, in Japanese Laid-open Patent Publication No. 2009-063856 and Japanese Laid-open Patent Publication No. 02-097909.

SUMMARY OF THE INVENTION

One aspect of the present invention provides a microscope comprising: a microscope main body including a light source unit and a main body side fitting unit for fitting an objective; and a darkfield objective in which a darkfield illumination optical path through which light from the light source unit passes is formed, the darkfield objective including an optical system for capturing light from a sample surface and a fitting unit that fits in the main body side fitting unit, wherein when the darkfield objective is attached to the microscope main body, the darkfield objective has incident end of the darkfield illumination optical path outside the fitting unit, where an optical axis of the optical system is central.

Another aspect of the present invention provides a microscope comprising: a light source unit; and a main body side fitting unit for fitting a darkfield objective, wherein when the darkfield objective is attached to the microscope, the microscope has emission end of a darkfield illumination optical path that guides light from the light source unit to the darkfield objective outside the main body side fitting unit, where an optical axis of the darkfield objective is central.

Another aspect of the present invention provides a darkfield objective in which a darkfield illumination optical path through which light from a light source provided for a microscope main body passes is formed, the darkfield objective comprising: an optical system for capturing light from a sample surface; and a fitting unit that fits in a main body side fitting unit provided for the microscope main body, wherein when the darkfield objective is attached to the microscope main body, the darkfield objective has incident end of the darkfield illumination optical path outside the fitting unit, where an optical axis of the optical system is central.

BRIEF DESCRIPTION OF THE DRAWINGS

The present invention will be more apparent from the following detailed description when the accompanying drawings are referenced.

FIG. 10 illustrates another configuration of the darkfield light source unit illustrated in FIG. 8.

FIG. 13 illustrates a configuration of a darkfield light source unit illustrated in FIG. 12.

DESCRIPTION OF THE EMBODIMENTS

Some embodiments of the present invention will be described below in detail with reference to the drawings.

Embodiment 1

Figure 1:
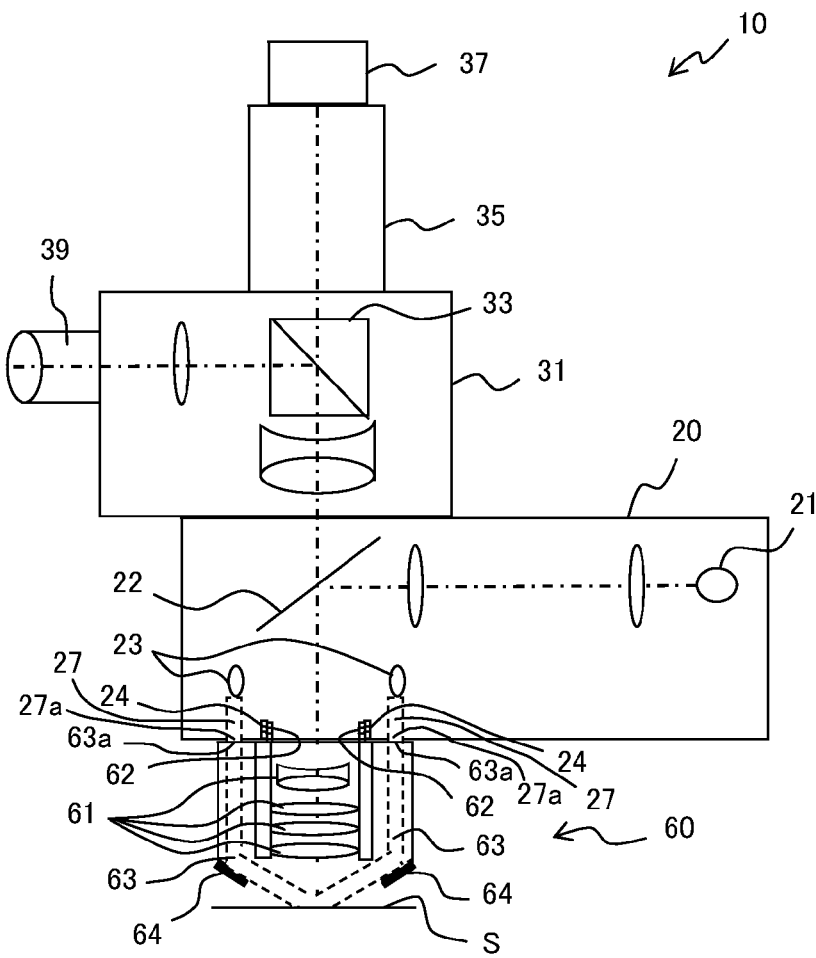
FIG. 1 illustrates a configuration of a microscope according to Embodiment 1 of the present invention.
Figure 2:
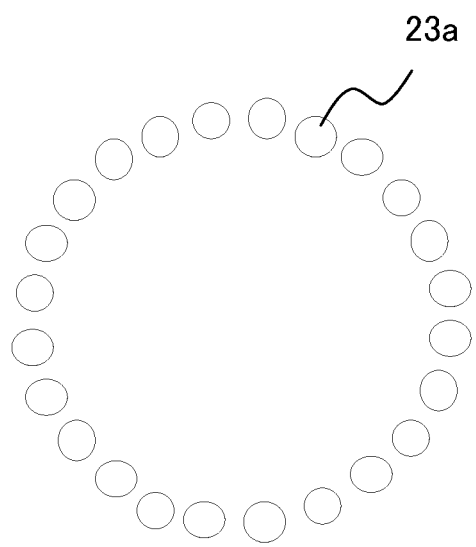
FIG. 2 illustrates a configuration of a darkfield light source unit illustrated in FIG. 1.

FIG. 1 illustrates a configuration of a microscope according to the present embodiment. FIG. 2 illustrates a configuration of a darkfield light source unit illustrated in FIG. 1. A microscope 100 illustrated in FIG. 1 includes a microscope main body 10 and a darkfield objective 60, and is used for reflected darkfield observation. Note that the microscope 100 may also be used for reflected brightfield illumination.

As illustrated in FIG. 1, the microscope main body 10 includes a reflected illuminator 20 provided with a half mirror 22 for branching a brightfield illumination optical path and a detection optical path, and an observation tube 31 provided with a half mirror prism 33 for branching an imaging optical path and a visual observation optical path. Further, the microscope main body 10 includes an imaging unit 37 provided with an image pickup device such as a CCD (Charge Coupled Device) and a camera adapter 35 for connecting the observation tube 31 with the imaging unit 37, in an imaging optical path. On the other hand, an eyepiece unit 39 provided with an eyepiece is provided in a visual observation optical path.

In addition to the half mirror 22, the reflected illuminator 20 includes a brightfield light source unit 21 used for brightfield observation, darkfield light source unit 23 used for darkfield observation, and a main body side fitting unit 24 for fitting an objective. As illustrated in FIG. 2, the darkfield light source unit 23 is, for example, an LED light source where LEDs (Light Emitting Diodes) 23a are arranged in a ring shape. The LEDs 23a are, for example, white LEDs that emit white light. Moreover, the LEDs 23a may emit light of wavelengths in an ultraviolet range (hereinafter, referred to as UV light) instead of white light so as to obtain a higher resolution. Alternatively, the LEDs 23a may emit visible light with a short wavelength, for example, light with wavelengths of the order of 400 nm to 480 nm, so as to perform a visual check.

The darkfield objective 60 includes a lens system 61 for capturing the light from a sample surface S, a fitting unit 62 fitted to the main body side fitting unit 24, and a deflection element 64 arranged on a darkfield illumination optical path 63.

In the darkfield objective 60, the darkfield illumination optical path 63 through which the light from the darkfield light source unit 23 passes is circularly formed outside the lens system 61 in such a manner as to surround the lens system 61. Incident end 63a of the darkfield illumination optical path 63 is formed on a mounting surface of the darkfield objective 60 that contacts the barrel of the reflected illuminator 20 in such a manner as to face the darkfield light source unit 23. In more detail, when the darkfield objective 60 is attached to the microscope main body 10, the darkfield objective 60 has the incident end 63a of the darkfield illumination optical path 63 outside the fitting unit 62, where the optical axis of the lens system 61 is the central axis. By contrast, when the darkfield objective 60 is attached to the microscope main body 10, the microscope 100 has emission end 27a of a darkfield illumination optical path 27 that guides the light from the darkfield light source unit 23 to the darkfield objective 60 outside the main body side fitting unit 24, where the optical axis of the darkfield objective 60 is the central axis.

The deflection element 64 is an optical element for deflecting to a sample in a slanting direction the light that enters the darkfield illumination optical path 63 parallel to the optical axis from the incident end 63a after being emitted from the darkfield light source unit 23. The deflection element 64 is, for example, a circular mirror arranged in the darkfield illumination optical path 63, or a circular lens whose center portion is penetrated.

The main body side fitting unit 24 and the fitting unit 62 typically compose a screw fitting unit on which an internal screw and an external screw are formed. However, the main body side fitting unit 24 and the fitting unit 62 are not limited to a screw fitting unit as long as the microscope main body 10 and the darkfield objective 60 are detachably fixed to each other. For example, the main body side fitting unit 24 and the fitting unit 62 may be a magnet fitting unit provided with permanent magnets each of which has a different magnetic pole.

In the microscope 100 configured as above, the light from the circularly arranged LEDs 23a enters the darkfield illumination optical path 63 formed within the darkfield objective 60 from the incident end 63a positioned outside the fitting unit 62, parallel to the optical axis of the darkfield objective 60. Then, the light from the circularly arranged LEDs 23a is deflected by the deflection element 64 arranged in the darkfield illumination optical path 63, and is applied to a sample surface S in a slanting direction. Here, the irradiation angle of the light is set to an angle where the regular reflection light never enters the lens system 61. Thus, only the light scattered at the sample surface S (hereinafter, this will be referred to as detection light) will enter the lens system 61. The detection light that has entered the lens system 61 passes through the half mirror 22, and enters the half mirror prism 33. The detection light that has passed through the half mirror prism 33 enters the imaging unit 37, and then is converted into an image signal. On the other hand, the detection light reflected at the half mirror prism 33 enters the eyepiece unit 39, and is visually observed.

In the present embodiment, upsizing of a lens system is expected, and the incident end 63a is arranged outside the position of the fitting unit 62 that is standardized under JIS (Japanese Industrial Standards) or the like. Then, the darkfield illumination optical path 63 is formed in the darkfield objective 60 and the darkfield light source unit 23 is provided for the microscope main body 10 in accordance with the position of the incident end 63a. As a result, according to the microscope 100 and the darkfield objective 60 according to the present embodiment, upsizing of a lens system having a darkfield objective may be achieved with a relatively simple configuration, without a need to provide the darkfield objective 60 with a darkfield light source or an element for expanding a luminous flux diameter.

Moreover, the mechanical structure of an objective will not be complicated, and thus there is no concern that the adjustment work of the objective will be complicated or the manufacturing cost of the objective will increase significantly compared to conventional darkfield objectives. It is true that a darkfield light source unit for performing darkfield observation is required in a microscope main body. However, the total cost required for observation by using a microscope may be reduced compared with when a darkfield light source unit is installed for every darkfield objective that is switched depending on its application.

Moreover, in the microscope 100, a darkfield illumination optical path (i.e., the optical path between the darkfield light source unit 23 and the darkfield objective 60) formed within the microscope main body 10 may be completely separated from a detection optical path (i.e., the optical path in the optical axis of the darkfield objective 60). Accordingly, stray light, which is caused when illumination light is reflected by an optical element placed between a light source and a sample and the reflected illumination light enters a detection optical path, may be reduced compared with when the brightfield light source unit 21 is used as a darkfield light source unit.

In the above, an example in which the microscope 100 includes the half mirror 22 for branching a brightfield illumination optical path and a detection optical path and the half mirror prism 33 for branching an imaging optical path and a visual observation optical path has been described. When darkfield observation is to be performed, the half mirror 22 may be detached. By so doing, an even brighter darkfield observation will be achieved. When only imaging is to be performed, the half mirror prism 33 may also be detached. When only visual observation is to be performed, a mirror may be arranged in place of the half mirror prism 33. If necessary, an optical path division element that guides detection light to an imaging optical path and a visual observation optical path at different ratios may be provided in place of the half mirror prism 33.

Figure 3:
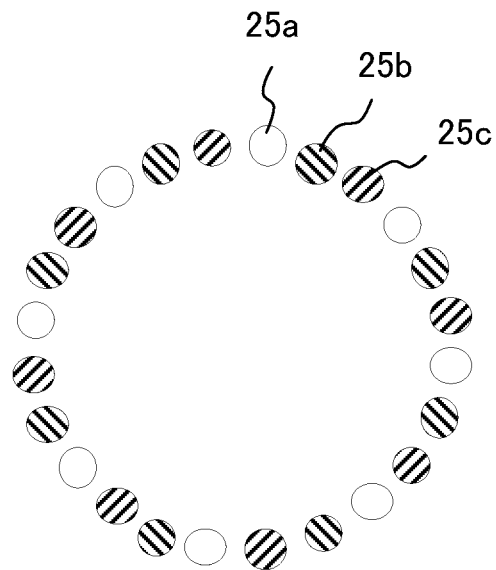
FIG. 3 illustrates another configuration of the darkfield light source unit illustrated in FIG. 1.
Figure 4:
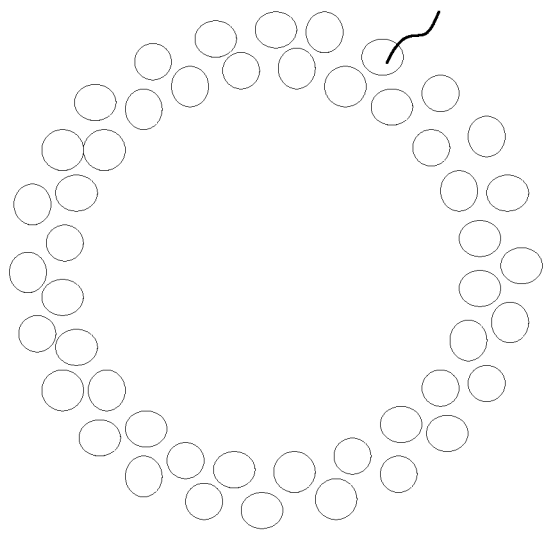
FIG. 4 illustrates yet another configuration of the darkfield light source unit illustrated in FIG. 1.

In FIG. 2, an example of the darkfield light source unit 23 that is an LED light source where the LEDs 23a are circularly arranged is illustrated as a darkfield light source unit. The microscope 100 may include a darkfield light source unit 25 that is an LED light source where red LEDs 25a, green LEDs 25b, and blue LEDs 25c are circularly arranged in the order listed as illustrated in FIG. 3, in place of the darkfield light source unit 23. Moreover, the microscope 100 may include a darkfield light source unit 26 that is an LED light source where double LEDs 26a are circularly arranged as illustrated in FIG. 4. Further, the microscope 100 may include a darkfield light source unit that is an LED light source where double red LEDs, double green LEDs, and double blue LEDs are circularly arranged.

Because the darkfield light source unit 25 illustrated in FIG. 3 is provided, different light sources may be used depending on how they will be utilized. For example, the blue LED 25c is used to obtain a higher resolution, the red LED 25a is used to obtain a greater depth of focus, and all the LEDs are used to perform illumination with white light. Because the darkfield light source unit 26 illustrated in FIG. 4 is provided, the number of the light emitters included in a darkfield light source unit may be increased. Accordingly, brighter illumination becomes possible, which is preferable for darkfield observation.

Figure 5:
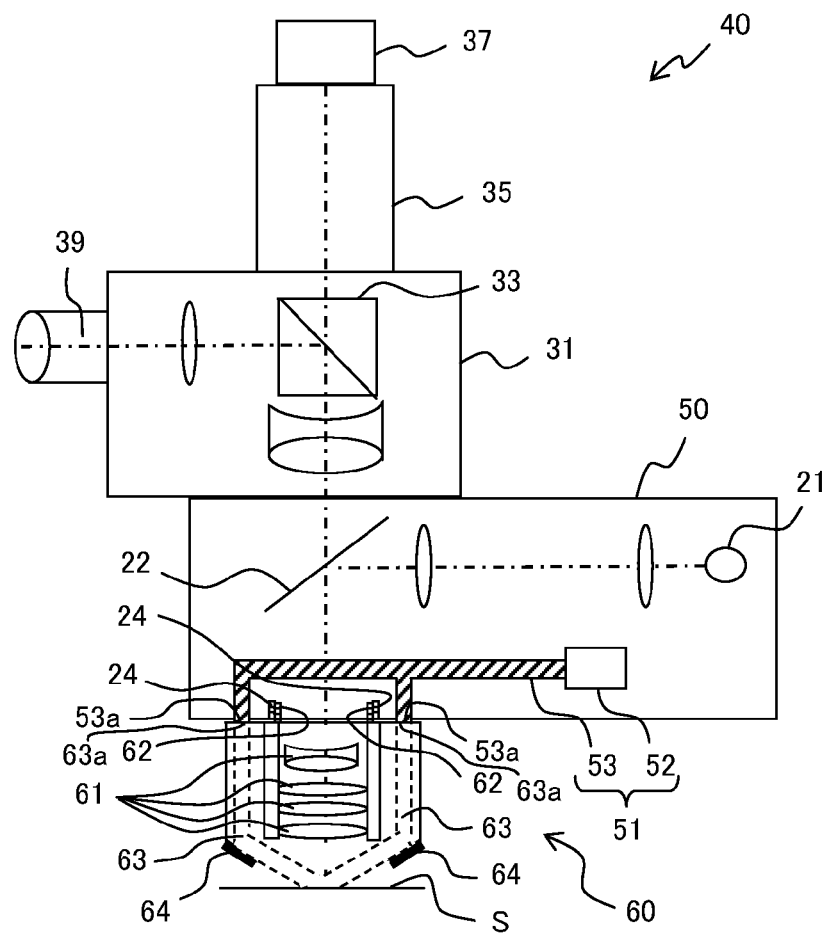
FIG. 5 illustrates a modification of the configuration of a microscope according to Embodiment 1 of the present invention.
Figure 6:
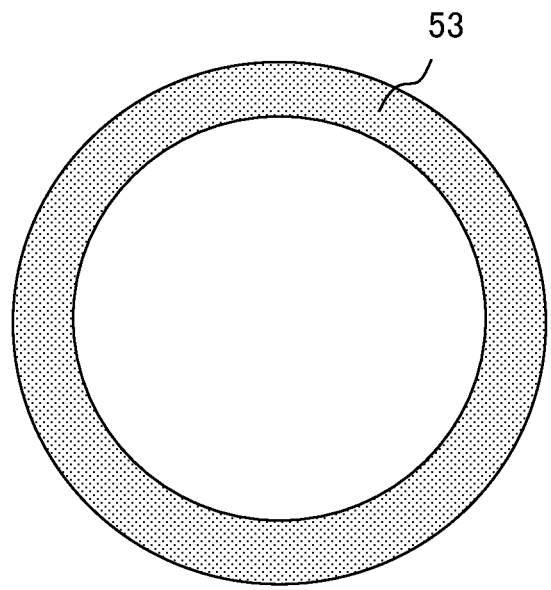
FIG. 6 illustrates a configuration of a darkfield light source unit illustrated in FIG. 5.

FIG. 5 illustrates a modification of the configuration of a microscope according to the present embodiment. FIG. 6 illustrates a configuration of the darkfield light source unit illustrated in FIG. 5. As illustrated in FIG. 5 and FIG. 6, a microscope may be provided with a fiber light source instead of the darkfield light source unit 23 that is an LED light source.

A microscope 101 illustrated in FIG. 5 is provided with a microscope main body 40 instead of the microscope main body 10, which is different from the microscope 100 illustrated in FIG. 1. The microscope main body 40 is provided with a reflected illuminator 50 instead of the reflected illuminator 20, and the reflected illuminator 50 is provided with a darkfield light source unit 51 that serves as a fiber light source instead of the darkfield light source unit 23 that is as an LED light source, where the darkfield light source unit 51 includes a light source 52 and an optical fiber 53 that composes a darkfield illumination optical path. As illustrated in FIG. 5, emission end 53a of the optical fiber 53 is connected to the incident end 63a of the darkfield illumination optical path 63 in the darkfield objective 60. In other words, the emission end 53a of the optical fiber 53 has a circular shape as illustrated in FIG. 6. The microscope 101 illustrated in FIG. 5 may achieve advantageous effects similar to those achieved by the microscope 100.

Figure 7:
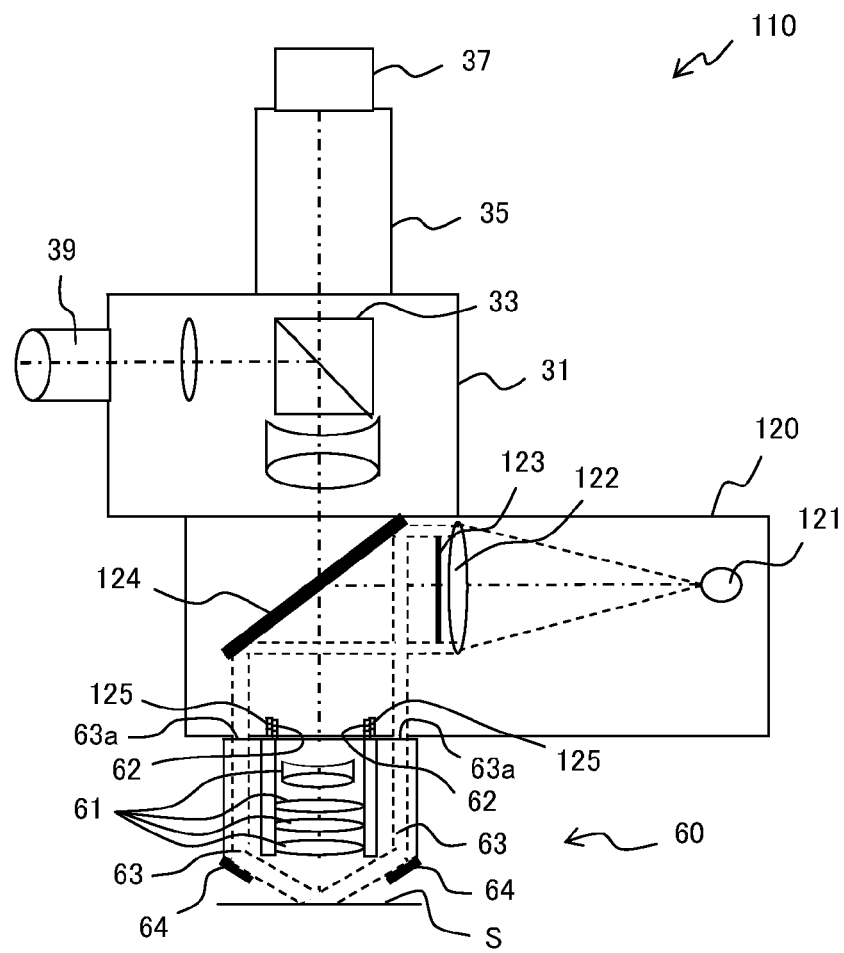
FIG. 7 illustrates another modification of the configuration of a microscope according to Embodiment 1 of the present invention.

FIG. 7 illustrates another modification of the configuration of a microscope according to the present embodiment. As illustrated in FIG. 7, the microscope may use a brightfield light source unit used for brightfield illumination as a darkfield light source unit instead of the darkfield light source unit 23 that is an LED light source.

A microscope 102 illustrated in FIG. 7 is provided with a microscope main body 110 instead of the microscope main body 10, which is different from the microscope 100 illustrated in FIG. 1. The microscope main body 110 is provided with a reflected illuminator 120 instead of the reflected illuminator 20. The reflected illuminator 120 is provided with a darkfield light source unit 121 that is a lamp light source, such as a high-pressure mercury lamp that may be used as a brightfield light source unit, a collimate lens 122, a stop 123 that is arranged on the sample side of the collimate lens 122 to shield the central portion of circular and parallel luminous flux, a half mirror 124, and a main body side fitting unit 125. In the reflected illuminator 120, the stop 123 shields the central portion of the circular and parallel light so as to form a circular luminous flux that enters the darkfield illumination optical path 63 in the darkfield objective 60.

Also in the microscope 102, upsizing of a lens system is expected, and the incident end 63a is arranged outside the position of the fitting unit 62 that is standardized under JIS or the like. Then, a darkfield illumination optical path is formed in the darkfield objective 60 and the reflected illuminator 120 in accordance with the positions of the incident end 63a. As a result, according to the microscope 102 according to the present embodiment, upsizing of a lens system having a darkfield objective may be achieved with a relatively simple configuration in a similar manner to the microscope 100, without a need to provide the darkfield objective 60 with a darkfield light source or an element for expanding a luminous flux diameter.

According to the microscope 102, the light source may be shared between the darkfield observation and brightfield observation, and thus the total cost required for observation by using a microscope may be reduced compared with the microscope 100.

Embodiment 2

Figure 8:
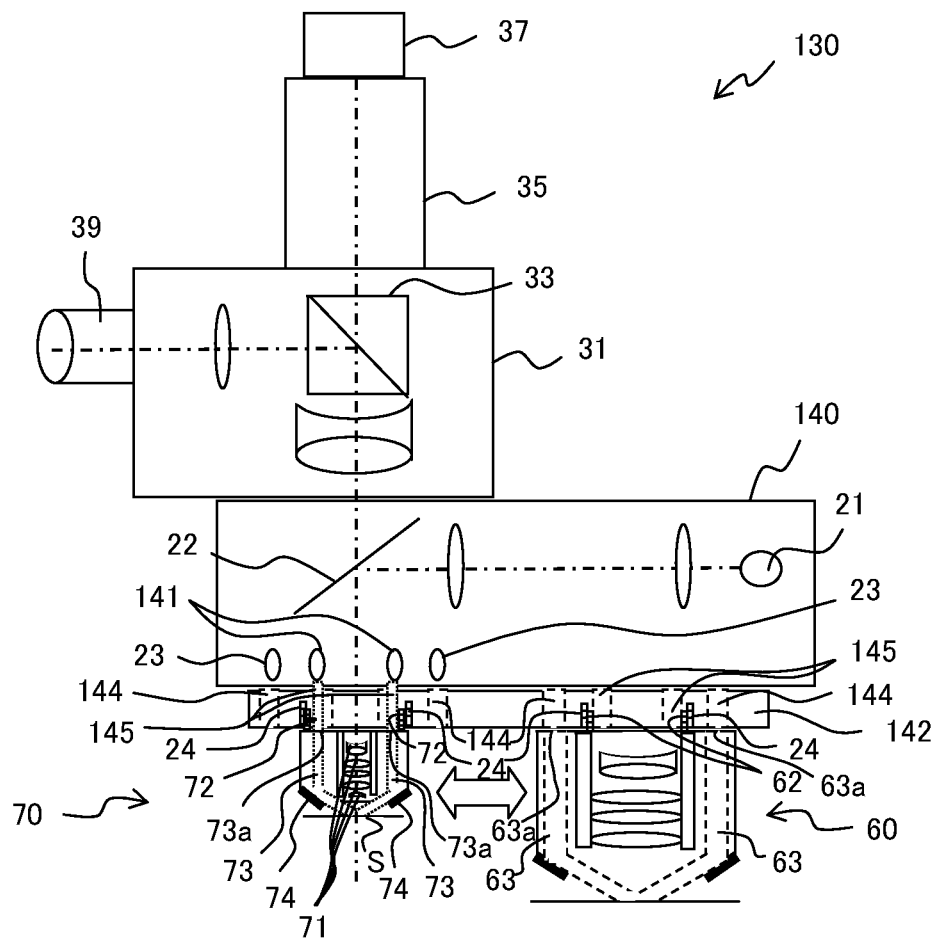
FIG. 8 illustrates a configuration of a microscope according to Embodiment 2 of the present invention.
Figure 9:
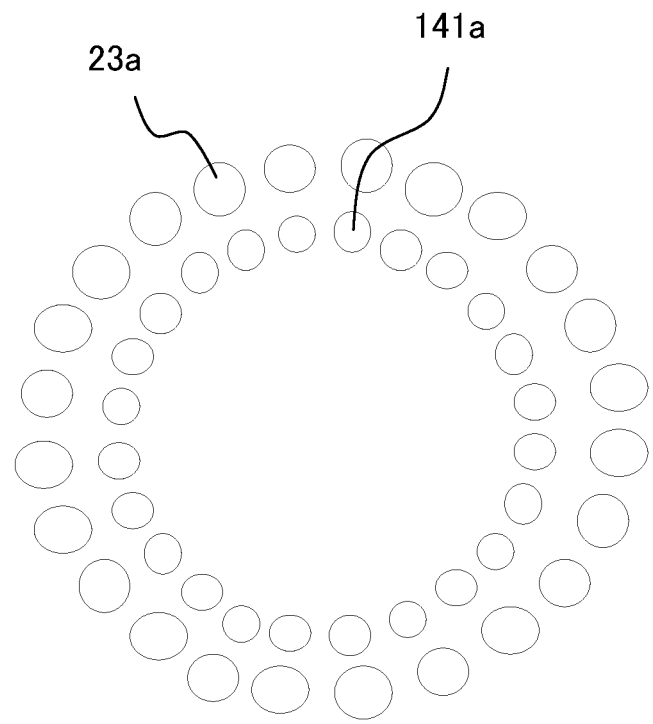
FIG. 9 illustrates a configuration of a darkfield light source unit illustrated in FIG. 8.

FIG. 8 illustrates a configuration of a microscope according to the present embodiment. FIG. 9 illustrates a configuration of a darkfield light source unit illustrated in FIG. 8. A microscope 103 illustrated in FIG. 8 includes a microscope main body 130 and a plurality of darkfield objectives (the darkfield objective 60 and a darkfield objective 70), and is used for reflected darkfield observation. Note that the microscope 103 may also be used for reflected brightfield illumination.

The microscope 103 is different from the microscope 100 illustrated in FIG. 1 in that the microscope main body 130 is provided instead of the microscope main body 10 and in that the darkfield objective 70 that serves as a second darkfield objective is provided for the microscope main body in addition to the darkfield objective 60 that serves as a first darkfield objective. The microscope 103 according to the present embodiment will be described below with an emphasis on differences from the microscope 100.

The darkfield objective 70 has a configuration similar to that of general darkfield objectives that have conventionally been used. In particular, the darkfield objective 70 includes a lens system 71 that serves as a second lens system for capturing the light from a sample surface S, a fitting unit 72 that serves as a second fitting unit being fitted to the main body side fitting unit 24, and a deflection element 74 arranged in a darkfield illumination optical path 73 that serves as a second darkfield illumination optical path. When the darkfield objective 70 is fitted to the microscope main body 130, the darkfield objective 70 is different from the darkfield objective 60 having the incident end 63a of the darkfield illumination optical path 63 outside the fitting unit 62, where the optical axis of the lens system 61 is the central axis, in that incident end 73a of the darkfield illumination optical path 73 is arranged inside the fitting unit 72, where the optical axis of the lens system 71 is the central axis.

A reflected illuminator 140 provided for the microscope main body 130 is different from the reflected illuminator 20 illustrated in FIG. 1 in that the reflected illuminator 140 is provided with darkfield light source unit 141 that serves as second light source unit used together with the darkfield objective 70 in addition to the darkfield light source unit 23 that serves as a first light source unit used together with the darkfield objective 60, and in that the reflected illuminator 140 is provided with a revolving nosepiece 142 to which a plurality of objectives (i.e., the darkfield objective 60 and the darkfield objective 70) are set.

The darkfield light source unit 141 is arranged so as to face the incident end 73a, such that the light from the darkfield light source unit 141 will pass through the darkfield illumination optical path 73 formed within the darkfield objective 70 when the darkfield objective 70 is used. In other words, LEDs 141a that make up the darkfield light source unit 141 in the reflected illuminator 140 are circularly arranged inside the LEDs 23a that make up the darkfield light source unit 23 and that is circularly arranged, as illustrated in FIG. 9. Note that the wavelength of the light emitted from the darkfield light source unit 23 may be different from the wavelength of the light emitted from the darkfield light source unit 141.

The revolving nosepiece 142 is provided with a plurality of main body side fitting units 24 to set a plurality of objectives thereto. Here, an example in which the darkfield objective 60 and the darkfield objective 70 with different parfocal lengths are set is illustrated. The revolving nosepiece 142 is configured to rotate manually or electrically. As the revolving nosepiece 142 rotates, one of the objectives set to the revolving nosepiece 142 is arranged in the detection optical path. Moreover, a circular darkfield illumination optical path 144 and a darkfield illumination optical path 145 are formed in the revolving nosepiece 142 for each of the main body side fitting units 24. The darkfield illumination optical path 144 is an optical path used for guiding the light emitted from the darkfield light source unit 23 to the incident end 63a when the darkfield objective 60 is arranged in the detection optical path. The darkfield illumination optical path 145 is an optical path used for guiding the light emitted from the darkfield light source unit 141 to the incident end 73a when the darkfield objective 70 is arranged in the detection optical path. Accordingly, the darkfield illumination optical path 144 and the darkfield illumination optical path 145 are formed in accordance with the position of the darkfield light source unit 23 and the darkfield light source unit 141. In other words, the microscope 103 has emission end of the darkfield optical path 144 that guides the light from the darkfield light source unit 23 to the darkfield objective 60 outside the main body side fitting unit 24, where the optical axis of the darkfield objective 60 is the central axis, and has emission end of the darkfield optical path 145 that guides the light from the darkfield light source unit 141 to the darkfield objective 70 inside the main body side fitting unit 24, where the optical axis of the darkfield objective 70 is the central axis.

In the microscope 103 configured as above, when the darkfield objective 60 having the larger lens system 61 is arranged in a detection optical path, satisfactory darkfield illumination may be realized by turning on the darkfield light source unit 23 and guiding the light from the darkfield light source unit 23 to pass through the darkfield illumination optical path 63 from the incident end 63a positioned outside the fitting unit 62. When the conventionally used darkfield objective 70 is arranged in a detection optical path, satisfactory darkfield illumination may be realized by turning on the darkfield light source unit 141 and guiding the light from the darkfield light source unit 141 to pass through the darkfield illumination optical path 73 from the incident end 73a positioned inside the fitting unit 72.

As a result, according to the microscope 103 according to the present embodiment, advantageous effects similar to those of the microscope 100 according to the Embodiment 1 may be achieved. In other words, upsizing of a lens system having a darkfield objective may be achieved with a relatively simple configuration, without a need to provide the darkfield objective with a darkfield light source or an element for expanding a luminous flux diameter. Moreover, the total cost required for observation by using a microscope may be reduced and the stray light may be reduced in a similar manner to Embodiment 1. In the microscope 103 according to the present embodiment, a conventional darkfield objective where a darkfield illumination optical path is formed inside a fitting unit may also be used.

Note that various modifications may be made to the microscope 103 according to the present embodiment in a similar manner to the microscope 100 according to Embodiment 1. For example, the darkfield light source unit 23 and the darkfield light source unit 141 that serve as an LED light source may be replaced with a fiber light source provided with the optical fiber 53, and a fiber light source provided with an optical fiber 54, respectively. In such cases, each of the emission ends of the optical fiber 53 and the optical fiber 54 has a circular shape as illustrated in FIG. 10, and the optical fiber 53 is formed so as to surround the optical fiber 54. The optical fiber 53 and the optical fiber 54 may be connected to the same light source.

Embodiment 3

Figure 11:
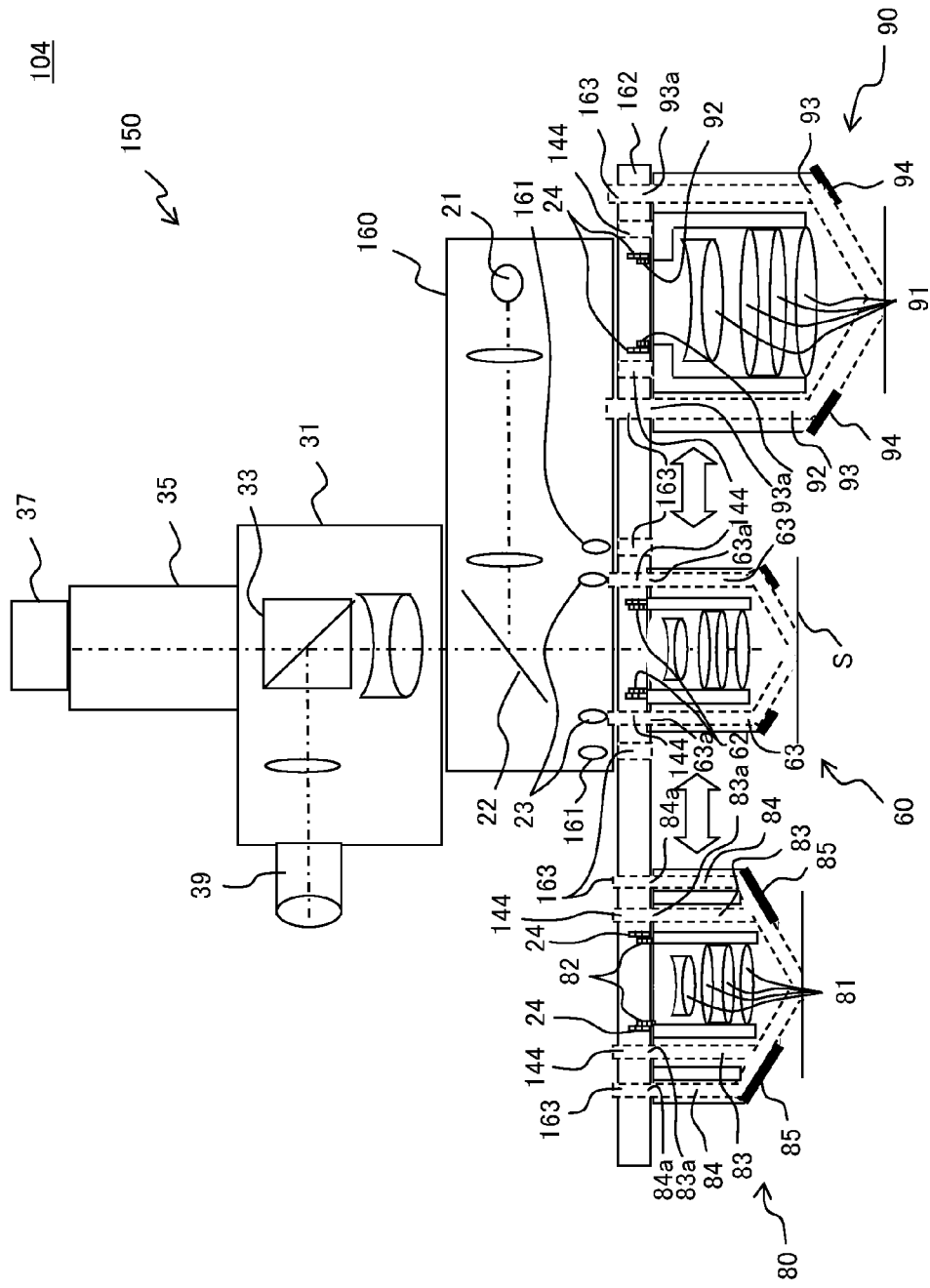
FIG. 11 illustrates a configuration of a microscope according to Embodiment 3 of the present invention.

FIG. 11 illustrates a configuration of a microscope according to the present embodiment. A microscope 104 illustrated in FIG. 11 includes a microscope main body 150 and a plurality of darkfield objectives (the darkfield objective 60, a darkfield objective 80, and a darkfield objective 90), and is used for reflected darkfield observation. Note that the microscope 104 may also be used for reflected brightfield illumination.

The microscope 104 is different from the microscope 100 illustrated in FIG. 1 in that the microscope main body 150 is provided instead of the microscope main body 10 and in that the darkfield objective 60 that serves as a first darkfield objective, the darkfield objective 80 that serves as a third darkfield objective, and the darkfield objective 90 that serves as a fourth darkfield objective are provided for the microscope main body. The microscope 104 according to the present embodiment will be described below with an emphasis on differences from the microscope 100.

The darkfield objective 80 includes a lens system 81 that serves as a third lens system for capturing the light from a sample surface S, a fitting unit 82 that serves as a third fitting unit being fitted to the main body side fitting unit 24, and a deflection element 85 arranged in a darkfield illumination optical path 83 that serves as a first darkfield illumination optical path and a darkfield illumination optical path 84 that serves as a third darkfield illumination optical path. When the darkfield objective 80 is fitted to the microscope main body 150, the darkfield objective 80 is different from the darkfield objective 60 having one incident end (i.e., the incident end 63a of the darkfield illumination optical path 63) outside the fitting unit 62, where the optical axis of the lens system 61 is the central axis, in that two incident ends (i.e., incident end 83a of the darkfield illumination optical path 83 and incident end 84a of the darkfield illumination optical path 84) are arranged outside the fitting unit 82, where the optical axis of the lens system 81 is the central axis. The darkfield illumination optical path 83 and the incident end 83a of the darkfield objective 80 correspond to the darkfield illumination optical path 63 and the incident end 63a of the darkfield objective 60, and are formed inside the darkfield illumination optical path 84 and the incident end 84a.

The darkfield objective 90 includes a lens system 91 that serves as a fourth lens system for capturing the light from a sample surface S, a fitting unit 92 that serves as a fourth fitting unit being fitted to the main body side fitting unit 24, and a deflection element 94 arranged in a darkfield illumination optical path 93 that serves as a third darkfield illumination optical path. When the darkfield objective 90 is fitted to the microscope main body 150, the darkfield objective 90 is similar to the darkfield objective 60 having one incident end (i.e., the incident end 63a of the darkfield illumination optical path 63) outside the fitting unit 62, where the optical axis of the lens system 61 is the central axis, in that one incident end (i.e., an incident end 93a of the darkfield illumination optical path 93) is arranged outside the fitting unit 92, where the optical axis of the lens system 91 is the central axis. Note however that the incident end 93a is different from the incident end 63a in that the incident end 93a is formed with a greater distance from the optical axis of a lens system. The darkfield illumination optical path 93 and the incident end 93a of the darkfield objective 90 correspond to the darkfield illumination optical path 84 and the incident end 84a of the darkfield objective 80.

A reflected illuminator 160 provided for the microscope main body 150 is different from the reflected illuminator 20 illustrated in FIG. 1 in that the reflected illuminator 160 is provided with a darkfield light source unit 161 that serves as a third light source unit in addition to the darkfield light source unit 23 that serves as the first light source unit, and in that the reflected illuminator 160 is provided with a revolving nosepiece 162 to which a plurality of objectives (i.e., the darkfield objective 60, the darkfield objective 80, and the darkfield objective 90) are set.

The darkfield light source unit 161 is arranged so as to face the incident end 84a, such that the light from the darkfield light source unit 161 will pass through the darkfield illumination optical path 84 formed within the darkfield objective 80 when the darkfield objective 80 is used. In other words, the darkfield light source unit 161 is arranged so as to face the incident end 93a, such that the light from the darkfield light source unit 161 will pass through the darkfield illumination optical path 93 formed within the darkfield objective 90 when the darkfield objective 90 is used.

On the other hand, the darkfield light source unit 23 is arranged so as to face the incident end 63a, such that the light from the darkfield light source unit 23 will pass through the darkfield illumination optical path 63 formed within the darkfield objective 60 when the darkfield objective 60 is used. In other words, the darkfield light source unit 23 is arranged so as to face the incident end 83a, such that the light from the darkfield light source unit 23 will pass through the darkfield illumination optical path 83 formed within the darkfield objective 80 when the darkfield objective 80 is used. Note that the wavelength of the light emitted from the darkfield light source unit 23 is different from the wavelength of the light emitted from the darkfield light source unit 161.

The revolving nosepiece 162 is provided with a plurality of main body side fitting units 24 to set a plurality of objectives thereto. Here, an example in which the darkfield objective 60, and the darkfield objective 80, and the darkfield objective 90 with different parfocal lengths are set is illustrated. The revolving nosepiece 162 is configured to slide manually or electrically. As the revolving nosepiece 162 slides, one of the objectives set to the revolving nosepiece 162 is arranged in the detection optical path. Moreover, the circular darkfield illumination optical path 144 and a circular darkfield illumination optical path 163 are formed in the revolving nosepiece 162 for each of the main body side fitting units 24. The darkfield illumination optical path 144 is an optical path used for guiding the light emitted from the darkfield light source unit 23 to the incident end 63a when the darkfield objective 60 is arranged in the detection optical path, and is an optical path used for guiding the light emitted from the darkfield light source unit 23 to the incident end 83a when the darkfield objective 80 is arranged in the detection optical path. The darkfield illumination optical path 163 is an optical path used for guiding the light emitted from the darkfield light source unit 161 to the incident end 84a when the darkfield objective 80 is arranged in the detection optical path, and is an optical path used for guiding the light emitted from the darkfield light source unit 161 to the incident end 93a when the darkfield objective 90 is arranged in the detection optical path. Accordingly, the darkfield illumination optical path 144 and the darkfield illumination optical path 163 are formed in accordance with the position of the darkfield light source unit 23 and the darkfield light source unit 161. In other words, the microscope 104 has emission end of the darkfield optical path 144 that guides the light from the darkfield light source unit 23 to a darkfield objective and emission end of the darkfield optical path 163 that guides the light from the darkfield light source unit 161 to a darkfield objective outside the main body side fitting unit 24, where the optical axis of the darkfield objective is the central axis.

In the microscope 104 configured as above, when the darkfield objective 60 having the larger lens system 61 is arranged in a detection optical path, satisfactory darkfield illumination may be realized by turning on the darkfield light source unit 23 and guiding the light from the darkfield light source unit 23 to pass through the darkfield illumination optical path 63 from the incident end 63a positioned outside the fitting unit 62. When the darkfield objective 90 having an even larger lens system 91 is arranged in a detection optical path, satisfactory darkfield illumination may be realized by turning on the darkfield light source unit 161 and guiding the light from the darkfield light source unit 161 to pass through the darkfield illumination optical path 93 from the incident end 93a positioned outside the fitting unit 92. When the darkfield objective 80 having a lens system 81 whose size is similar to that of the lens system 61 is arranged in a detection optical path, satisfactory darkfield illumination may be realized by turning on at least one of the darkfield light source unit 23 or the darkfield light source unit 161.

As a result, according to the microscope 104 according to the present embodiment, advantageous effects similar to those of the microscope 100 according to Embodiment 1 may be achieved. In other words, upsizing of a lens system having a darkfield objective may be achieved with a relatively simple configuration, without a need to provide the darkfield objective with a darkfield light source or an element for expanding a luminous flux diameter. Moreover, the total cost required for observation by using a microscope may be reduced and the stray light may be reduced in a similar manner to Embodiment 1. In the microscope 104 according to the present embodiment, when the darkfield objective 80 where the darkfield illumination optical path 83 through which the light from the darkfield light source unit 23 passes and the darkfield illumination optical path 84 through which the light from the darkfield light source unit 161 passes are formed is used, even brighter satisfactory darkfield illumination may be realized by turning on both the darkfield light source unit 23 and the darkfield light source unit 161.

Note that various modifications may be made to the microscope 104 according to the present embodiment in a similar manner to the microscope 100 according to Embodiment 1.

Embodiment 4

Figure 12:
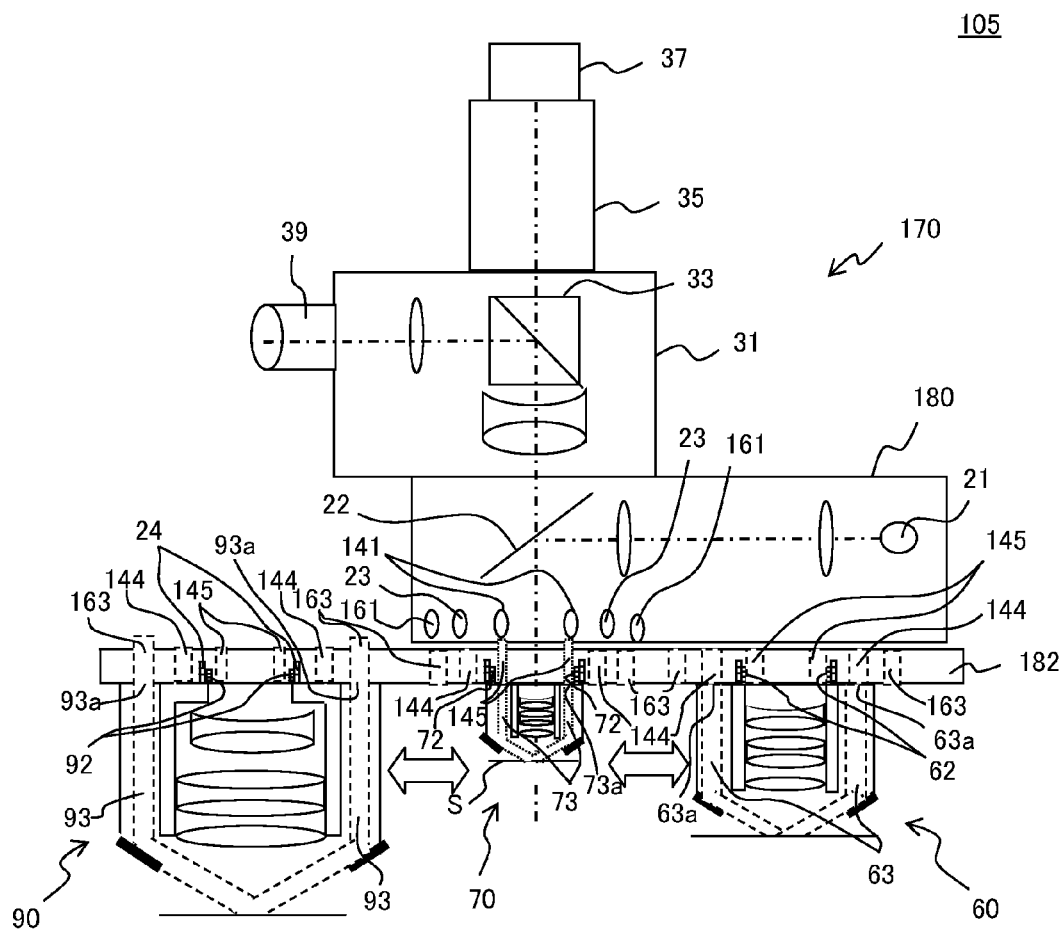
FIG. 12 illustrates a configuration of a microscope according to Embodiment 4 of the present invention.

FIG. 12 illustrates a configuration of a microscope according to the present embodiment. FIG. 13 illustrates a configuration of a darkfield light source unit illustrated in FIG. 12. A microscope 105 illustrated in FIG. 12 includes a microscope main body 170 and a plurality of darkfield objectives (the darkfield objective 60, the darkfield objective 70, and the darkfield objective 90), and is used for reflected darkfield observation. Note that the microscope 105 may also be used for reflected brightfield illumination.

The microscope 105 is different from the microscope 100 illustrated in FIG. 1 in that the microscope main body 170 is provided instead of the microscope main body 10 and in that the darkfield objective 60 that serves as a first darkfield objective, the darkfield objective 70 that serves as a second darkfield objective, and the darkfield objective 90 that serves as a fourth darkfield objective are provided for the microscope main body. The microscope 105 according to the present embodiment will be described below with an emphasis on differences from the microscope 100.

The darkfield objective 60, the darkfield objective 70, and the darkfield objective 90 are configured in a similar manner to the elements described in Embodiment 1 through Embodiment 3, and thus the detailed description will be omitted.

A reflected illuminator 180 provided for the microscope main body 170 is different from the reflected illuminator 20 illustrated in FIG. 1 in that the reflected illuminator 180 is provided with the darkfield light source unit 141 that serves as a second light source unit and the darkfield light source unit 161 that serves as the third light source unit in addition to the darkfield light source unit 23 that serves as the first light source unit, and in that the reflected illuminator 180 is provided with a revolving nosepiece 182 to which a plurality of objectives (i.e., the darkfield objective 60, the darkfield objective 70, and the darkfield objective 90) are set.

The darkfield light source unit 23 is arranged so as to face the incident end 63a, such that the light from the darkfield light source unit 23 will pass through the darkfield illumination optical path 63 formed within the darkfield objective 60 when the darkfield objective 60 is used.

The darkfield light source unit 141 is arranged so as to face the incident end 73a, such that the light from the darkfield light source unit 141 will pass through the darkfield illumination optical path 73 formed within the darkfield objective 70 when the darkfield objective 70 is used.

The darkfield light source unit 161 is arranged so as to face the incident end 93a, such that the light from the darkfield light source unit 161 will pass through the darkfield illumination optical path 93 formed within the darkfield objective 90 when the darkfield objective 90 is used.

In other words, LEDs 141a that make up the darkfield light source unit 141 in the reflected illuminator 180 are circularly arranged inside the LEDs 23a that make up the darkfield light source unit 23 and that is circularly arranged, as illustrated in FIG. 13. Moreover, LEDs 161a that make up the darkfield light source unit 161 in the reflected illuminator 180 are circularly arranged outside the LEDs 23a that make up the darkfield light source unit 23 and that is circularly arranged, as illustrated in FIG. 13.

The revolving nosepiece 182 is provided with a plurality of main body side fitting units 24 to set a plurality of objectives thereto. Here, an example in which the darkfield objective 60, the darkfield objective 70, and the darkfield objective 90 with different parfocal lengths are set is illustrated. The revolving nosepiece 182 is configured to slide manually or electrically, and as the revolving nosepiece 182 slides, one of the objectives set to the revolving nosepiece 182 is arranged in the detection optical path. Moreover, the circular darkfield illumination optical path 144, the circular darkfield illumination optical path 145, and the circular darkfield illumination optical path 163 are formed in the revolving nosepiece 182 for each of the main body side fitting units 24. The darkfield illumination optical path 144 is an optical path used for guiding the light emitted from the darkfield light source unit 23 to the incident end 63a when the darkfield objective 60 is arranged in the detection optical path. The darkfield illumination optical path 145 is an optical path used for guiding the light emitted from the darkfield light source unit 141 to the incident end 73a when the darkfield objective 70 is arranged in the detection optical path. The darkfield illumination optical path 163 is an optical path used for guiding the light emitted from the darkfield light source unit 161 to the incident end 93a when the darkfield objective 90 is arranged in the detection optical path. Accordingly, the darkfield illumination optical path 144, the darkfield illumination optical path 145, and the darkfield illumination optical path 163 are formed in accordance with the position of the darkfield light source unit 23, the darkfield light source unit 141, and the darkfield light source unit 161. In other words, the microscope 105 has emission end of the darkfield optical path 144 that guides the light from the darkfield light source unit 23 to a darkfield objective and emission end of the darkfield optical path 163 that guides the light from the darkfield light source unit 161 to a darkfield objective outside the main body side fitting unit 24, where the optical axis of the darkfield objective is the central axis, and has emission end of the darkfield optical path 145 that guides the light from the darkfield light source unit 141 to a darkfield objective inside the main body side fitting unit 24, where the optical axis of the darkfield objective is the central axis.

In the microscope 105 configured as above, when the darkfield objective 60 having the larger lens system 61 is arranged in a detection optical path, satisfactory darkfield illumination may be realized by turning on the darkfield light source unit 23 and guiding the light from the darkfield light source unit 23 to pass through the darkfield illumination optical path 63 from the incident end 63a positioned outside the fitting unit 62. When the darkfield objective 90 having the even larger lens system 91 is arranged in a detection optical path, satisfactory darkfield illumination may be realized by turning on the darkfield light source unit 161 and guiding the light from the darkfield light source unit 161 to pass through the darkfield illumination optical path 93 from the incident end 93a positioned outside the fitting unit 92. When the conventionally used darkfield objective 70 is arranged in a detection optical path, satisfactory darkfield illumination may be realized by turning on the darkfield light source unit 141 and guiding the light from the darkfield light source unit 141 to pass through the darkfield illumination optical path 73 from the incident end 73a positioned inside the fitting unit 72.

As a result, according to the microscope 105 according to the present embodiment, advantageous effects similar to those of the microscope 100 according to Embodiment 1 may be achieved. In other words, upsizing of a lens system having a darkfield objective may be achieved with a relatively simple configuration, without a need to provide the darkfield objective with a darkfield light source or an element for expanding a luminous flux diameter. Moreover, the total cost required for observation by using a microscope may be reduced and the stray light may be reduced in a similar manner to Embodiment 1. In the microscope 105 according to the present embodiment, a conventional darkfield objective where a darkfield illumination optical path is formed inside a fitting unit may also be used.

The embodiments described above are given as concrete examples for the purpose of facilitating understanding of the invention, and it should be understood that the present invention is not limited to these embodiments. Various applications and modifications may be made to the microscope and darkfield objective according to the embodiments without departing from the spirit or scope of the invention defined by the claims.

What is claimed is:

1. A microscope comprising:
a microscope main body including a first light source unit, a second light source unit, and a main body side fitting unit for fitting a first darkfield objective and a second darkfield objective;
wherein:
the first darkfield objective, in which a first darkfield illumination optical path through which light from the first light source unit passes is provided, includes a first optical system for capturing light from a sample surface and a first fitting unit that fits in the main body side fitting unit;
the second darkfield objective, in which a second darkfield illumination optical path through which light from the second light source unit passes is provided, includes a second optical system for capturing light from the sample surface and a second fitting unit that fits in the main body side fitting unit;
when the first darkfield objective is attached to the microscope main body, an incident end of the first darkfield illumination optical path is located at a position that is more distant than a position of the first fitting unit from an optical axis of the first optical system; and
when the second darkfield objective is attached to the microscope main body, an incident end of the second darkfield illumination optical path is located at a position that is closer than a position of the second fitting unit to an optical axis of the second optical system.

2. A microscope comprising:
a microscope main body including a first light source unit, a second light source unit, and a main body side fitting unit for fitting a first darkfield objective and a second darkfield objective;
wherein:
the first darkfield objective, in which a first darkfield illumination optical path through which light from the first light source unit passes is provided, includes a first optical system for capturing light from a sample surface and a first fitting unit that fits in the main body side fitting unit;
the second darkfield objective, in which a second darkfield illumination optical path through which light from the first light source unit passes and a third darkfield illumination optical path through which light from the second light source unit passes are provided, includes a second optical system for capturing light from the sample surface and a second fitting unit that fits in the main body side fitting unit;
when the first darkfield objective is attached to the microscope main body, an incident end of the first darkfield illumination optical path is located at a position that is more distant than a position of the first fitting unit from an optical axis of the first optical system; and
when the second darkfield objective is attached to the microscope main body, an incident end of the first second darkfield illumination optical path and an incident end of the third darkfield illumination optical path are each located at a position that is more distant than a position of the second fitting unit from an optical axis of the second optical system.

3. A microscope comprising:
a microscope main body including a first light source unit, a second light source unit, and a main body side fitting unit for fitting a first darkfield objective and a second darkfield objective;
wherein:
the first darkfield objective, in which a first darkfield illumination optical path through which light from the first light source unit passes is provided, includes a first optical system for capturing light from a sample surface and a first fitting unit that fits in the main body side fitting unit;
the second darkfield objective, in which a second darkfield illumination optical path through which light from the second light source unit passes is provided, includes a second optical system for capturing light from the sample surface and a second fitting unit that fits in the main body side fitting unit;
when the first darkfield objective is attached to the microscope main body, an incident end of the first darkfield illumination optical path is located at a position that is more distant than a position of the first fitting unit from an optical axis of the first optical system; and
when the second darkfield objective is attached to the microscope main body, an incident end of the second darkfield illumination optical path is located at a position that is more distant than a position of the second fitting unit from an optical axis of the second optical system.

4. The microscope according to claim 1, wherein the first light source unit comprises LED light sources that are arranged in a ring shape.

5. The microscope according to claim 4, wherein the first light source unit comprises LED light sources that are doubly arranged in a ring shape.

6. The microscope according to claim 1, wherein the first light source unit comprises a fiber light source.

7. The microscope according to claim 1, wherein:
the microscope main body includes a revolving nosepiece to which a plurality of objectives to be switched and used are set, and
the revolving nosepiece includes a plurality of the main body side fitting units.

8. The microscope according to claim 7, wherein darkfield objectives with different parfocal lengths are set to the revolving nosepiece.

9. The microscope according to claim 1, wherein the first light source unit emits light with a wavelength in an ultraviolet range.

10. The microscope according to claim 1, wherein the first light source unit emits light with a wavelength ranging from 400 nm to 480 nm.

11. The microscope according to claim 1, wherein a wavelength of light emitted from the first light source unit is different from a wavelength of light emitted from the second light source unit.

12. The microscope according to claim 2, wherein a wavelength of light emitted from the first light source unit is different from a wavelength of light emitted from the second light source unit.

* * * * *